UNITED STATES PATENT OFFICE 2,259,138

METHOD OF PREPARING ELECTRICALLY INSULATING MATERIAL

Hideo Inutsuka, Tokyo Denki K. K., Japan, assignor to General Electric Company, a corporation of New York No Drawing. Application March 20, 1939, Serial No. 263,099. In Japan March 26, 1938

3 Claims. (Cl. 106—46)

This invention relates to a method of preparing an electrically insulating material of high dielectric constant and low power factor. More particularly the invention is concerned with an insulating material formed by sintering at an elevated temperature a mixture comprising titanium dioxide having incorporated therewith not exceeding substantially 40 per cent by weight thereof of lead oxide, specifically $Pb_3O_4$, commonly known as red lead or minium.

I have discovered that a dense, homogeneous insulating material having a dielectric constant of the order of 80 to 105 and an exceedingly low power factor can be produced by sintering together in an oxidizing atmosphere a mixture of titanium dioxide and not exceeding 40 per cent, more particularly from 5 to 35 per cent, by weight thereof of $Pb_3O_4$. While the temperature at which the sintering operation is carried out may be varied somewhat, in general best results are obtained by heating the mixed components, molded to the desired shape, at temperatures of the order of 1200 to 1350° C. Molded articles thereby obtained are very dense, being substantially non-porous, are mechanically strong, and have a wide variety of electrical applications, especially where a material of high dielectric constant and low dielectric loss under high frequency is desired, as for example in the construction of certain condensers or capacitors.

In one case approximately 5% red lead was added to titanium dioxide. A suitable organic binder, as for instance starch paste or paraffin, also was incorporated into the mass in order to facilitate shaping to the desired form. The shaped article was placed in a furnace and the temperature therein slowly raised until it reached about 1350° C., maintaining an oxidizing atmosphere in the furnace throughout the heating operation. The dielectric substance formed in this way was found to be of exceptionally high quality. It was substantially non-porous (zero per cent porosity) and had a dielectric constant of nearly 100.

In another case approximately 10% red lead was incorporated with titanium dioxide as above described, the firing of the shaped article to vitrification being discontinued at a maximum furnace temperature of 1300° C. The porosity of the final product was substantially zero and it had a dielectric constant of the order of 90 to 92.

It is important that the amount of red lead with respect to the titanium dioxide does not exceed substantially 40% of the amount of titania in the mixture, as otherwise I have found that the red lead will exude from the mass during heating, producing an entirely unsatisfactory article. Preferably, the amount of red lead is materially less than 40% by weight of the titanium dioxide, for example 35% per cent by weight thereof or lower.

Table 1 shows characteristic properties of $TiO_2$-$Pb_3O_4$ compositions produced in accordance with this invention. In the column headings designating the percentages of $Pb_3O_4$, it will be understood that this has reference to the percentage of $Pb_3O_4$ with respect to the titanium dioxide; also that K designates the dielectric constant and tan δ, the power factor.

*Table*

| Cycles | 5% $Pb_3O_4$ | | 10% $Pb_3O_4$ | | 20% $Pb_3O_4$ | | 30% $Pb_3O_4$ | |
|---|---|---|---|---|---|---|---|---|
| | K | tan δ | K | tan δ | K | tan δ | K | tan δ |
| | | Percent | | Percent | | Percent | | Percent |
| 50 | 105 | 0.6 | 100 | 0.6 | 97–99 | 0.5 | 83–85 | 0.5 |
| 1000 | 98 | 0.35 | 95 | 0.37 | 90 | 0.3 | 83–85 | 0.5 |
| 3×10⁶ | 90 | 0.25 | 87 | 0.25 | 83–87 | 0.23 | 80–86 | 0.22–0.23 |

The power factor is materially influenced by the amount of iron oxide which is present in the starting materials, or is introduced into the composition during the processing operations. The more the iron oxide content, the higher is the power factor. Hence it is desirable to use raw materials as free as possible from iron oxide, and to endeavor to prevent contamination of the materials with iron oxide during processing.

In case the furnace atmosphere retains some reducing characteristics, the values for K and tan δ may tend to vary at the higher $Pb_3O_4$ contents. It is therefore advantageous to provide a furnace atmosphere which is entirely oxidizing in its characteristics throughout the entire heating or sintering period. Since titanium dioxide and $Pb_3O_4$ can be readily pulverized to a fine powder, the manufacturing technique involves no difficulties such as sometimes are encountered with harder or more refractory materials.

What I claim as new and desire to secure by Letters Patent of the United States is:

1. The method of making a shaped dielectric material having a high dielectric constant and a low power factor, which comprises forming a plastic mass of a mixture comprising titanium dioxide, from 5 to 40 per cent by weight thereof of $Pb_3O_4$, and an organic binder for said components, shaping the resulting mass, and firing the shaped mass at an elevated temperature in an oxidizing atmosphere until a dense product results.

2. A method as in claim 1 wherein the shaped mass is fired at a temperature of 1200° to 1350° C.

3. The method of making a shaped dielectric material having a high dielectric constant and a low power factor which comprises forming a plastic mass of a mixture containing titanium dioxide, approximately 10 per cent by weight thereof of $Pb_3O_4$ and an organic binder for the said components, shaping the resulting mass, and firing the shaped mass to vitrification in an oxidizing atmosphere at a temperature of the order of 1200° to 1350° C.

HIDEO INUTSUKA.